US009074912B2

(12) United States Patent
Hassel et al.

(10) Patent No.: US 9,074,912 B2
(45) Date of Patent: Jul. 7, 2015

(54) BEARING CURRENT SENSOR DEVICE HAVING AN ENERGY CONVERTER

(75) Inventors: Jörg Hassel, Erlangen (DE); Richard Schmidt, Baiersdorf (DE); Arno Steckenborn, Berlin (DE); Oliver Theile, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 340 days.

(21) Appl. No.: 13/581,568

(22) PCT Filed: Mar. 1, 2010

(86) PCT No.: PCT/EP2010/001257
§ 371 (c)(1),
(2), (4) Date: Aug. 28, 2012

(87) PCT Pub. No.: WO2011/107108
PCT Pub. Date: Sep. 9, 2011

(65) Prior Publication Data
US 2012/0319678 A1 Dec. 20, 2012

(51) Int. Cl.
*G01R 1/20* (2006.01)
*G01D 11/02* (2006.01)
*F16C 19/52* (2006.01)
*H02K 11/00* (2006.01)

(52) U.S. Cl.
CPC .............. *G01D 11/02* (2013.01); *F16C 19/52* (2013.01); *H02K 11/001* (2013.01)

(58) Field of Classification Search
CPC .......................... H02K 7/1807; H02K 11/0015
USPC ............ 324/207.11–207.14, 207.25, 765.01, 324/764.01, 545–546
See application file for complete search history.

(56) References Cited

U.S. PATENT DOCUMENTS

| | | | | |
|---|---|---|---|---|
| 5,493,214 A | * | 2/1996 | Good et al. | 324/173 |
| 6,346,808 B1 | * | 2/2002 | Schroeder | 324/207.21 |
| 7,141,907 B2 | * | 11/2006 | Yang et al. | 310/239 |
| 8,610,591 B2 | * | 12/2013 | Kretschmer et al. | 340/682 |
| 2002/0023496 A1 | * | 2/2002 | Ono et al. | 73/593 |
| 2005/0150281 A1 | * | 7/2005 | Schroeder et al. | 73/116 |
| 2010/0289485 A1 | * | 11/2010 | Eggimann | 324/207.25 |
| 2011/0175631 A1 | | 7/2011 | Kretschmer et al. | |

FOREIGN PATENT DOCUMENTS

| | | |
|---|---|---|
| CN | 2160902 Y | 4/1994 |
| CN | 1090927 A | 8/1994 |
| CN | 1342890 A | 4/2002 |

(Continued)

OTHER PUBLICATIONS

H. William Oh, Shaft Grounding—A Solution to Motor Bearing Currents, 114 ASHRAE Transactions 246 (2008).*

*Primary Examiner* — Tung X Nguyen
*Assistant Examiner* — Robert P Alejnikov, Jr.
(74) *Attorney, Agent, or Firm* — Henry M. Feiereisen LLC.

(57) ABSTRACT

A sensor device includes an exchangeable module shaped as a substantially annular disk and concentrically mounted at or on a shaft of an electric machine. The exchangeable module includes a detection device for detecting a bearing current of the electric machine and an energy converter device configured to convert mechanical energy of the shaft into electrical energy for transmission to the detection device.

6 Claims, 3 Drawing Sheets

(56) References Cited

FOREIGN PATENT DOCUMENTS

| DE | 102008035613 | A1 | * | 1/2010 |
| EP | 1022702 | A2 | | 7/2000 |
| SU | 830119 | | | 5/1981 |

* cited by examiner

BEARING CURRENT SENSOR DEVICE HAVING AN ENERGY CONVERTER

CROSS-REFERENCES TO RELATED APPLICATIONS

This application is the U.S. National Stage of International Application No. PCT/EP2010/001257, filed Mar. 1, 2010, which designated the United States and has been published as International Publication No. WO 2011/107108 A1.

BACKGROUND OF THE INVENTION

The present invention relates to a sensor device for mounting at or on a shaft of an electric machine, having a detection device for detecting a bearing current of the electric machine.

Bearing currents frequently occur in converter-fed electric machines. They very quickly cause damage to the ball or roller bearing, resulting in drive failure. To detect bearing currents, permanently mounted sensor systems are therefore used. These are designed to continuously monitor the drive. As the bearing currents cannot be measured directly during actual operation of equipment, the proposed bearing current sensors detect the occurrence of bearing currents by measuring the electric shaft potential of the machine. For this purpose either a sliding contact (brush) or contactless connection (e.g. by means of capacitive coupling) is used. The advantage of a contactless connection is that there no wear, i.e. no maintenance is required.

Such a sensor system requires an energy supply for operation. Mounting a bearing current sensor on a motor shaft or a shaft bearing therefore poses the question of how the sensor can be supplied with energy.

Supplying energy from the load circuit (power supply of the motor) is only possible with great complexity because of the high voltages and powers often present. Another possibility for generating energy is to use electromagnetic fields in the immediate vicinity of the electric machine. The latter are becoming ever fewer as leakage is optimized, and are therefore becoming more difficult to use.

At present, batteries or installed power supply units are normally used to supply energy to motor-associated sensors. These solutions result in increased maintenance requirements or additional installation costs.

All in all, a sensor system for detecting the bearing current is typically composed of the following components: coupling, sensor, evaluation unit, power supply or battery. These are generally implemented by a plurality of separate constructional units or devices.

The object of the present invention is therefore to reduce the complexity for detecting bearing currents in electric machines.

SUMMARY OF THE INVENTION

This object is achieved according to the invention by a sensor device for mounting at or on a shaft of an electric machine, having a detection device for detecting a bearing current of the electric machine, and an energy converter device which is combined with the detection device to form an exchangeable module, for converting mechanical energy of the shaft into electrical energy for the detection device.

It is thus advantageously possible during operation of the electric machine to obtain electrical energy for the detection device in a self-sufficient manner. A sensor device is also present which is easily exchangeable or rather retrofitable as a module, i.e. as a single compact component, independently of an external energy supply.

The detection device and the energy converter device are preferably accommodated in a common housing. With the common housing, the modularity of the sensor device is further underscored and the housing also provides protection for both the detection device and the energy converter device.

The sensor device can be essentially annular disk shaped and can be mounted at or on the shaft of the electric machine, concentrically therewith. The disk shape means that it only requires very little mounting space in the axial direction.

In addition, the detection device can be designed for capacitive pick-up of the bearing current, thereby allowing wear-free detection of the bearing current or rather of a voltage that is characteristic thereof.

Alternatively, the detection device can also have a brush for detecting the bearing current, in order to establish galvanic contact with a slip ring on the shaft or with the shaft itself. In some cases this enables the charging current to be measured directly.

In another embodiment, the sensor device can possess an interfacing device for wireless transmission of data from the detection device. This also reduces the installation work for the sensor device, as no cables for data transmission need to be installed.

In addition, the energy converter device can have an inductive pick-up and magnetic or magnetizable elements which can be mechanically coupled to the shaft or can be an integral part thereof. This means that the normal generator principle can be used for generating the electrical energy.

In addition, the sensor device can have a circuit board as the carrier of at least one component of the detection device and of the energy converter device. This means that the carrier additionally assumes the function of also being or possibly being the carrier of signal processing components, it being particularly advantageous if the sensor device also has, in its housing, a signal processing device for processing the signals from the detection device. Bearing current signals can therefore be output in a predefined format.

As already indicated above, a particularly preferred application of the sensor device is to use it for an electric machine or a thereto connected load machine with a rotating shaft.

The present invention will now be explained in greater detail with reference to the accompanying drawings in which:

DETAILED DESCRIPTION OF PREFERRED EMBODIMENTS

The exemplary embodiments described in greater detail below represent preferred embodiments of the present invention. The basic idea of the invention is that mechanical rotational energy at a shaft of an electric machine 1 or of a load machine 2 connected thereto is always amply available during operation. This energy source shall therefore be used in connection with the components required for the sensors for bearing current detection.

Figure 1:
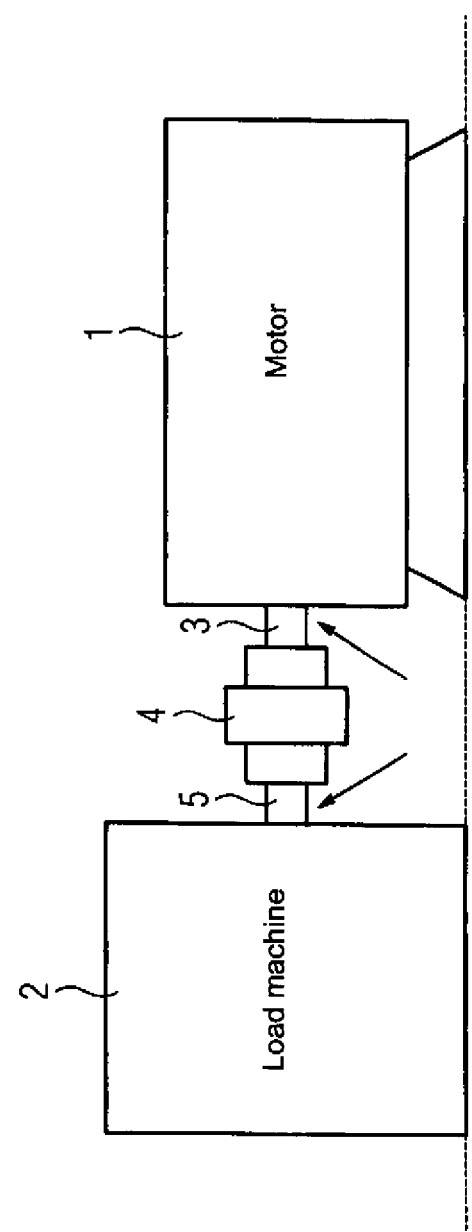
FIG. 1 shows a schematic diagram of a motor with a load machine connected thereto.

FIG. 1 shows a typical drive configuration consisting of the motor 1, the load machine 2, the drive shaft 3 of the motor as well as a shaft coupling 4 and the shaft 5 of the load machine 2. Possible mounting positions for a bearing current sensor on the drive shaft 3 and the shaft 5 are indicated by arrows in FIG. 1.

According to one embodiment, the problem of supplying power to a bearing current sensor and of integrating the various necessary device functions in one entity can be solved according to one embodiment by using both the induction generator principle and design-related capacitive coupling between the rotating shaft and the sensor electronics. As the sensor electronics only have a relatively low power consumption, the device for converting the mechanical rotational energy into electrical energy must be constructed and designed such that, rather then achieving a high energy efficiency, the effect of capacitive coupling to the electric potential of the motor shaft is particularly utilized.

If a structure (ring, disk, impression in the shaft material) is applied to the shaft of the electric machine which, when it is in motion, generates a variable magnetic flux in its vicinity (toothed structure, shaft structure, impressed magnetization) and an annular structure or an insulated (plastic) housing with integrated coils is mounted around the outside, these coils can be excited by the magnetic structure on the shaft and therefore assume a generator function as the shaft rotates. Known examples of this are induction generators or disk-type generators.

At the same time, a conductive strip applied to the housing can also be used as a capacitor structure in order to capacitively pick off the bearing current signal. This solution provides a wear-free means of detecting the electric shaft potential.

By means of the proposed solution, a compact, energy self-sufficient device for bearing current detection can be constructed whose disk-shaped outer contour enables it to be mounted on even poorly accessible shafts or short shaft stubs and which can be designed to provide a high degree of protection.

Figure 2:
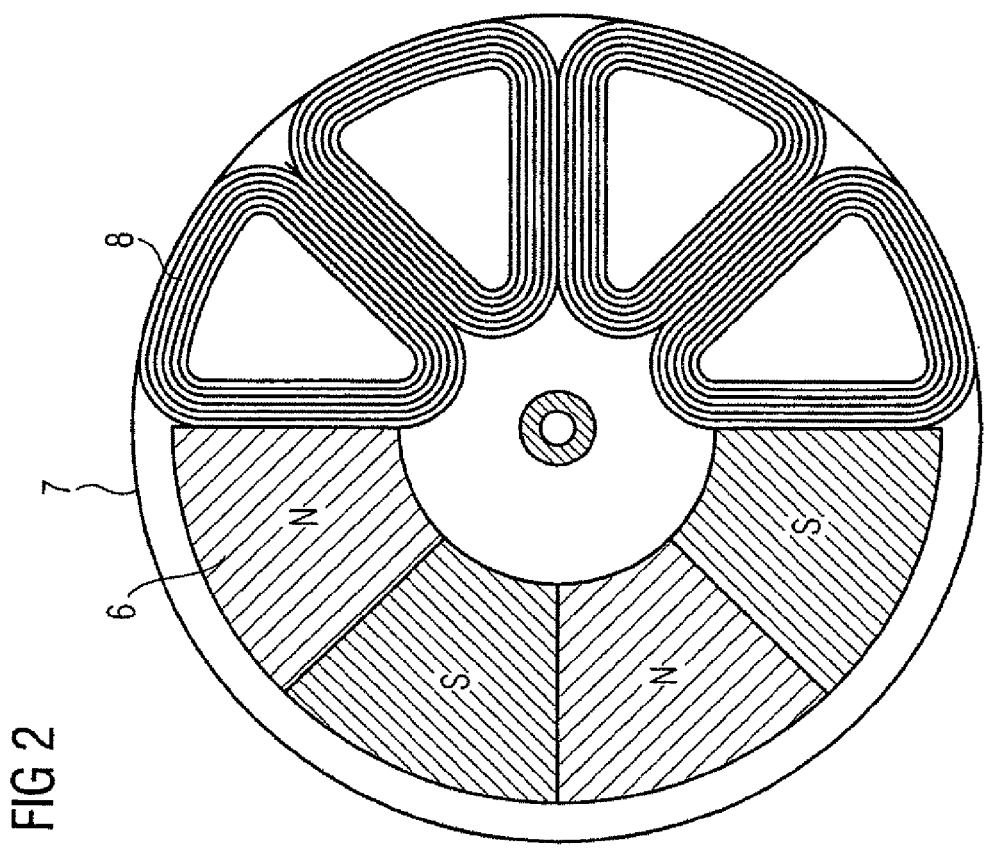
FIG. 2 shows a disk-type generator.

A concrete example of a generator suitable for producing the electrical energy for the bearing current sensor is shown in FIG. 2. This is an eight-pole disk-type generator of the kind used, for example, in small wind turbines. The disk-type generator has a disk that can be mounted on the respective shaft, said disk having circumferentially distributed magnetic poles 6. Spaced axially apart from the shaft in this example are eight coils 8 distributed over the entire disk. For representational reasons, four of the total of eight poles 6 on the rotating disk 7 are shown in FIG. 2 in the left-hand half of the axial view of the disk-type generator. Shown on the right-hand half of the drawing in FIG. 2 are four of the eight coils 8.

Figure 3:
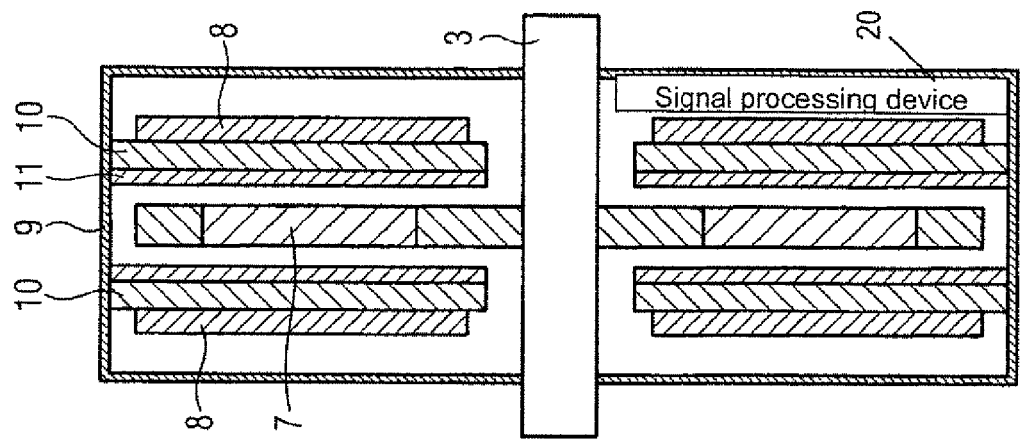
FIG. 3 shows a bearing current detector inventively incorporated in a disk-type generator.

FIG. 3 now shows the disk-type generator from FIG. 2 incorporated into a sensor device for detecting a bearing current. The representation in FIG. 3 is a cross-sectional view along the axis of the shaft 3. Mounted on the shaft 3 is the co-rotating disk 7 made of metal or metalized which is provided with magnetic zones or integral magnets (poles 6). The rotating disk 7 of the disk-type generator is enclosed by a fixed housing 9. Said housing 9 also accommodates a signal processing device 20 as well as coil carriers 10 in front of and behind the rotating disk 7 in the axial direction. These are made, for example, of circuit board material and support the air-core coils 8. There are therefore air-core coil arrangements on both sides of the rotating disk 7, half of which are depicted in the right-hand half of FIG. 2. The air-core coils can be implemented conventionally or in the form of printed traces.

The side of each coil carrier 10 facing the rotating disk 7, i.e. the rotor, is designed to act as a capacitor surface of a capacitive bearing current sensor (the rotating disk acting as the other capacitor plate). The coil carriers 10 are therefore coated there with an electrically conductive material 11. This coating can be, for example, a continuous copper surface on the respective circuit board or rather the respective coil carrier 10. The capacitor comprising the rotating disk 7 and the metallic carrier coating 11 is used as the detection device for detecting a bearing current.

Instead of capacitive coupling, galvanic contact can also be established with the rotating disk. The galvanic contact can be implemented, for example, using sliding contacts or carbon fiber brushes.

The fixed circuit board used as a carrier 10 can be additionally populated with electrical and electronic components in the usual way. These circuit sections can be used to implement the rectification and voltage conditioning required for the power supply, the analog and digital signal processing and the data communication with the higher-order system.

This integrated arrangement provides, in a single unit, the function of an energy converter, that of signal coupling for detecting the shaft potential, and analog or digital signal evaluation.

Figure 4:
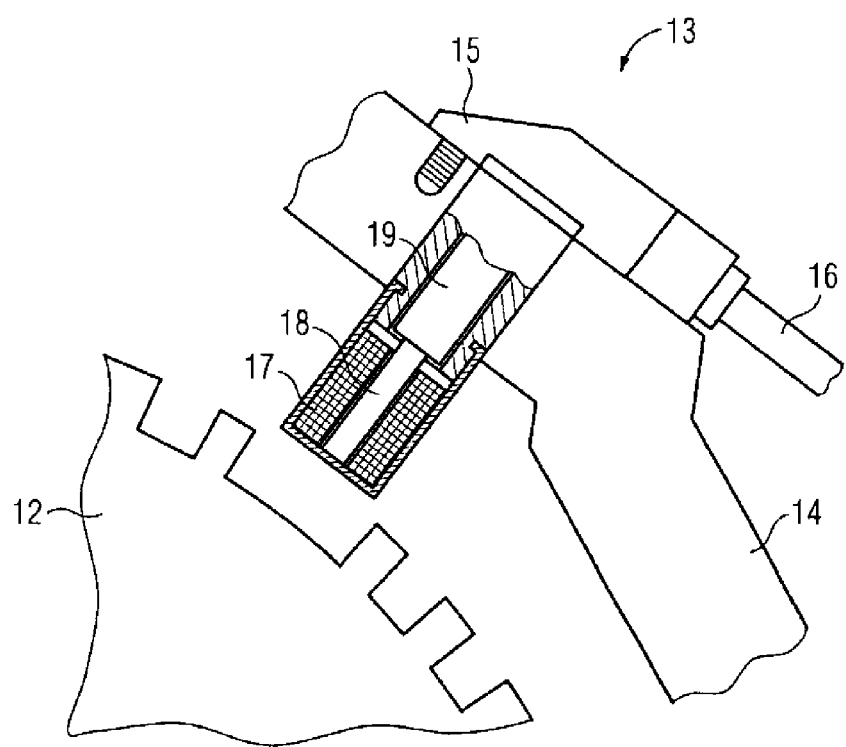
FIG. 4 shows an energy converter with induction generator and toothed disk.

Further embodiments of the energy production can also be based on the induction generator principle. FIG. 4 shows an embodiment comprising a toothed disk 12 and an induction generator 13 disposed radially thereto. Said induction generator 13 is attached, for example, to a motor housing 14 or rather to a housing of the electric machine. It itself has a housing 15 which is here bolted onto the motor housing 14 and from which an electrical lead 16 is brought out. The actual generator section projects radially toward the toothed disk 12 and has a coil 17 and a magnetic iron core. The latter is implemented by providing the coil 17 with a soft iron core 18 which is magnetized by a permanent magnet 19 located axially outside the coil. A voltage is induced in the coil 17 when the magnetic field at the end face of the generator 13 changes. This is the case when the magnetic impedance changes when the teeth of the toothed disk 12 sweep past the end of the generator.

In order to produce a pulsating voltage, either a toothed wheel or a perforated disk can be used. In the case of a toothed wheel, the generator can be mounted both radially and axially. Instead of a perforated disk, a disk with magnetic conductive elements can also be used.

Such induction generators are currently widely used as incremental position encoders, i.e. as sensors. Although it is unusual for them to be used as generators because of their poor efficiency, in some cases they are wholly practicable for very small energy consumptions. The advantage of induction generators is that they are extremely robust.

With the inventive linking and combining of sensor operation with energy supply, an energy self-sufficient sensor system is implemented, thereby conferring in particular the following advantages:

As bearing current monitoring is only required in the case of rotating shafts, the energy generating state coincides precisely with the required operational readiness of the sensor system. Energy buffering to bridge idle times is therefore unnecessary or only necessary to a small extent.

These sensor systems are additionally provided with wireline or wireless (radio) communication with a higher-order system, so that in general no measured values or other data need to be volatilely stored for a lengthy period while the machine is idle.

As no external power supply needs to be brought out to the sensor system, installation work is reduced.

If the measurement data is fed out over a radio interface, no wiring is involved.

The absence of external cable connections on the equipment facilitates implementation with a high level of protection (e.g. dust protection, splash water protection).

With suitable mechanical design of the system, retrofitting is possible without having to modify the existing installation. This includes equipment divisibility in order to enable the retrofitting to be carried out without dismantling the drive or the shaft coupling.

Because of the possible compact design and the elimination of maintenance based on energy self-sufficient operation, the sensor system can be incorporated into appropriately prepared machines. Here too a disk-shaped contour is advantageous, as very limited space is available in the vicinity of the bearing shield.

What is claimed is:

1. A sensor device shaped as a substantially annular disk and configured to be concentrically mounted at or on a shaft of an electric machine, the sensor device comprising
    a detection device configured for capacitive pick-up of a bearing current of the electric machine, and
    an energy converter device configured to convert mechanical energy of the shaft into electrical energy for transmission to the detection device, wherein the energy converter device comprises an inductive pick-up and magnetic or magnetizable elements which are mechanically coupled to the shaft.

2. The sensor device of claim 1, wherein the detection device and the energy converter device are accommodated in a common housing.

3. The sensor device of claim 2, further comprising a signal processing device for processing signals from the detection device, said signal processing device disposed in the common housing.

4. The sensor device of claim 1, further comprising an interface device for wireless transmission of data from the detection device.

5. The sensor device of claim 1, further comprising a circuit board configured as carrier of at least one component of the detection device and of the energy converter device.

6. An electric machine comprising:
    a rotating shaft, and
    a sensor device shaped as a substantially annular disk and configured to be concentrically mounted at or on the rotating shaft of the electric machine, the sensor device comprising
    a detection device configured for capacitive pick-up of a bearing current of the electric machine, and
    an energy converter device configured to convert mechanical energy of the shaft into electrical energy for transmission to the detection device, wherein the energy converter device comprises an inductive pick-up and magnetic or magnetizable elements which are mechanically coupled to the rotating shaft.

* * * * *